United States Patent
Steffens et al.

(10) Patent No.: US 6,296,952 B1
(45) Date of Patent: Oct. 2, 2001

(54) SLIDING BEARING MATERIAL BASED ON ALUMINUM WITH 10-25 WT % TIN ALLOYED WITH MANGANESE AND SILICON

(75) Inventors: Thomas Steffens, Bad-Rappenau; Werner Schubert, Wiesloch, both of (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 0 days.

(21) Appl. No.: 09/554,059

(22) PCT Filed: Nov. 12, 1998

(86) PCT No.: PCT/EP98/07234
§ 371 Date: Jul. 17, 2000
§ 102(e) Date: Jul. 17, 2000

(87) PCT Pub. No.: WO99/25886
PCT Pub. Date: May 27, 1999

(30) Foreign Application Priority Data

Nov. 15, 1997 (DE) .............................. 197 50 740

(51) Int. Cl.[7] .......................... F16C 33/12; C22C 21/00; B32B 15/20
(52) U.S. Cl. ......................... 428/653; 420/528; 420/548; 384/912
(58) Field of Search .................... 428/653, 654; 384/912; 420/528, 548

(56) References Cited

U.S. PATENT DOCUMENTS

| 4,471,029 |   | 9/1984  | Fukuoka . |         |
|-----------|---|---------|-----------|---------|
| 4,806,308 |   | 2/1989  | Soji .    |         |
| 5,384,205 | * | 1/1995  | Tanaka et al. | 428/643 |
| 5,470,666 |   | 11/1995 | Tadashi . |         |
| 5,908,709 | * | 6/1999  | Deicke et al. | 428/653 |

FOREIGN PATENT DOCUMENTS

| 3214303  | * | 1/1983  | (DE) . |
|----------|---|---------|--------|
| 43 12 537|   | 11/1993 | (DE) . |
| 2 027 050|   | 2/1980  | (GB) . |
| 2247467  | * | 3/1992  | (GB) . |
| 2 271 779|   | 4/1994  | (GB) . |
| 56-35743 | * | 4/1981  | (JP) . |
| 62-63638 | * | 3/1987  | (JP) . |

* cited by examiner

*Primary Examiner*—John J. Zimmerman
(74) *Attorney, Agent, or Firm*—Paul Vincent

(57) ABSTRACT

The stability under load and deformability of an aluminum-based sliding bearing material with 10–25 mass 6 tin are improved in that the aluminum alloy is composed of tin with the admixture of silicon and manganese, the remainder being aluminum, in that the proportions of manganese and silicon amount each to 0.2–2 mass %, and in that the ratio of the percentage by mass of manganese to the percentage by mass of silicon lies between 0.6 and 1.5.

6 Claims, 1 Drawing Sheet

SLIDING BEARING MATERIAL BASED ON ALUMINUM WITH 10-25 WT % TIN ALLOYED WITH MANGANESE AND SILICON

BACKGROUND OF THE INVENTION

The invention concerns a sliding bearing material made from an aluminum alloy with 10 to 25 mass % tin.

A sliding bearing material of this kind is disclosed e.g. in DE 40 04 703 A1. The single embodiment describes an aluminum alloy with a composition of AlSn10NiMn1Cu0.5, wherein instead of tin, lead can also be added. With aluminum alloys of this kind which are used as sliding bearing material, a "soft phase" in the form of a tin or lead precipitate is required for ensuring good emergency running properties of a bearing produced from the sliding bearing material. Hard contaminating particles or abrasions are accommodated or embedded in this soft phase. The soft phase can also adapt to geometric conditions. The soft phase of tin, which does not dissolve in aluminum, is accepted in the form of block-like precipitates within the aluminum matrix.

Copper can be added to increase the strength of the aluminum matrix. Copper, in connection with aluminum, forms intermetallic phases, so-called hard material phases, such as $Al_2Cu$ and finely distributed precursor stages thereof which increase the stability of the aluminum matrix when present as finely distributed precipitates ($\leq 1$ μm). This increases the stability under load and fatigue resistance of a sliding bearing material produced from the alloy. The aluminum alloy AlSn15Cu2 has been disclosed by the assignee under the trade name KS 985.3. This alloy has excellent tribological properties, but requires improvements for applications under extreme loads, such as e.g. connecting rod bearings in modern internal combustion engines.

Such improvements were attempted with the aluminum alloy disclosed in DE 40 04 703 A1 by adding manganese and nickel, in an attempt, according to this document, to increase the portion of hard substance phases, in particular, in the region of tin precipitates to improve binding of the tin precipitates in the aluminum matrix via the affinity of tin for nickel and manganese.

A certain proportion of hard substance phases or precipitates is believed to have positive effects on wear resistance in that the hard substance phases at the surface effect fine grinding of the sliding partner, e.g. the crank shaft, to ensure that roughness peaks of the steel sliding partner can be abraded. The hard substance phases also increase the stability under load of the bearing material.

Increasing the portion of intermetallic hard substance phases causes problems with respect to fatigue resistance and manufacturing. Cracks are formed during shaping, in particular during cold plating of the aluminum alloy on steel, requiring a pass producing approximately 50% shaping.

U.S. Pat. No. 4,471,029 describes an aluminum silicon tin sliding bearing material with 0.5 to 5, preferably 2 to 5 mass % silicon with the addition of at least one of the following elements: lead, indium, thallium, cadmium, bismuth, copper, magnesium, chrome or manganese. The document teaches formation of elementary silicon precipitates having a particular dimensional spectrum.

It is the underlying purpose of the present invention to improve an alloy of the above mentioned kind such that it has better stability under load than the conventional aluminum tin copper or aluminum tin copper nickel alloy and better deformability, in particular plateability.

SUMMARY OF THE INVENTION

This object is achieved by a sliding bearing material of the above mentioned kind, wherein the aluminum alloy consists essentially of tin, with silicon and manganese additives, the balance being aluminum, and manganese and silicon each have a portion of 0.2 to 2 mass % and the ratio of the mass % portion of manganese to the mass % portion of silicon is between 0.8 and 1.2.

Clearly, the inventive aluminum alloy is a technical alloy which can contain impurities, normally element impurities up to a maximum of 0.2 mass % per element. A total amount of additional substance impurities of up to approximately 1 mass % can be present.

U.S. Pat. No. 5,470,666 discloses an aluminum alloy (within the context of a not preferred comparative product) comprising tin, silicon, manganese and the rest being aluminum. The ratio of manganese to silicon lies outside of that of the present invention.

Within the scope of the invention, it has been determined that the addition of manganese to increase the vibrational strength is disadvantageous without the simultaneous addition of silicon. The alloy AlSn12Cu1.5Mn1 has very poor rolling properties due to the relatively coarse manganese aluminides.

Moreover, such coarse, hard precipitates cause reduced vibrational or fatigue strength in the sliding bearing due to their internal bonding.

When the aluminum alloy of the sliding bearing material in accordance with the invention comprises, in addition to tin, only manganese and silicon in the mass % portions and in the mutual mass % ratios stated, the inter-metallic phase $Mn_3Si_2Al_{15}$ can be established in a finely distributed form to enable good rolling properties for the alloy. The stated range of mass % ratios of the portions of manganese and silicon as claimed has proven to be advantageous since this composition primarily causes formation of the above mentioned inter-metallic phase and does not lead to precipitation of elementary silicon. The finely distributed inter-metallic phases have no disadvantageous influence on the vibrational or fatigue strength. Manganese has a very high affinity for silicon which prevents its distribution during heat treatment and precipitation into coarse structures. The manganese silicon aluminides are therefore present in a finely distributed form even after heat treatment to 250 degrees, due to the very low solubility of silicon in the mixed aluminum crystal.

BRIEF DESCRIPTION OF THE DRAWING

Further features, details and advantages of the invention can be extracted from the following photomicrographs of sliding bearing materials and their description.

DESCRIPTION OF THE PREFERRED EMBODIMENT

Figure 1:
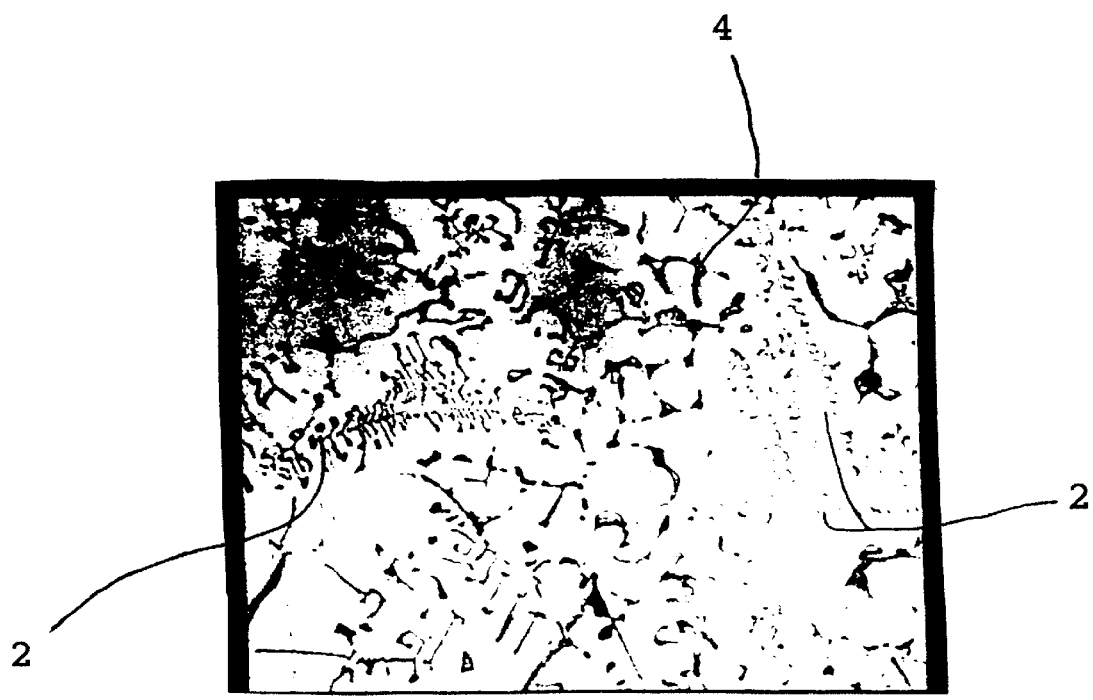
FIG. 1 shows a photomicrograph of an inventive sliding bearing material.

FIG. 1 shows a photomicrograph of an inventive sliding bearing material made from the aluminum alloy AlSn12Mn2Si2 as cast. This alloy is characterized by finely distributed skeleton-like and filigree precipitates 2 in the form of the inter-metallic phase $Mn_3Si_2Al_{15}$. Tin precipitates 4 are also visible. Due to the fine distribution of this inter-metallic phase 2, the sliding bearing substance has good shaping and rolling properties.

Figure 2:
FIG. 2 shows a photomicrograph of a sliding bearing material.

FIG. 2 shows the photomicrograph of a sliding bearing material made from the aluminum alloy AlSn20Cu1.5Mn1. It has coarse, beam-like manganese aluminides 6 which prevent satisfactory shaping, in particular rolling. The manganese of this aluminum alloy precipitates in the form of coarse manganese aluminides due to the absence of silicon. These cannot be eliminated even by subsequent heat treatment in excess of 300° C. The reference numeral 8 designates tin precipitates.

What is claimed is:

1. A sliding bearing material made from an aluminum alloy, the aluminum alloy consisting of;

tin, silicon and manganese additives, and impurities up to a maximum of 0.2 mass % per element and of up to approximately 1 mass % in total, the balance being aluminum, wherein the manganese and silicon each have a portion of 0.7 to 1.3 mass % and the ratio of the mass % portion of manganese to the mass % portion of silicon is between 0.8 and 1.2.

2. The sliding bearing material of claim 1, further comprising hard substance precipitates forming an inter-metallic phase $Mn_3Si_2Al_{15}$.

3. The sliding bearing material of claim 1, wherein said portion of tin is between 10 to 20 mass %.

4. The sliding bearing material of claim 3, wherein said portion of tin is between 10 to 15 mass %.

5. The sliding bearing material of claim 1, wherein said aluminum alloy is shaped into a sliding layer, and further comprising a hard-metallic supporting layer on which said sliding layer is disposed.

6. The sliding bearing material of claim 5, wherein said sliding layer is rolled onto said supporting layer.

* * * * *